L. Lovejoy,
Well Tubing.

N°81,801.  Patented Sep. 1, 1868.

Witnesses.
J. H. Adams
C. J. Lovejoy

Inventor.
Lorenzo Lovejoy

United States Patent Office.

LORENZO LOVEJOY, OF MALDEN, MASSACHUSETTS.

*Letters Patent No. 81,801, dated September 1, 1868.*

IMPROVEMENT IN WELL-TUBES.

The Schedule referred to in these Letters Patent and making part of the same.

Be it known that I, LORENZO LOVEJOY, of Malden, in the county of Middlesex, and State of Massachusetts, have invented a new and useful Improvement in Well-Tubes, of which the following is a full, clear, and exact description, reference being had to the accompanying drawings, making a part of this specification, in which—

Figure 1:
Figure 2:

Figure 1 represents an elevation of the lower end of a well-tube embodying my improvement, and Figure 2 is a longitudinal vertical section of the same.

The nature of my invention consists in the combination, with the lower end of a well-tube, of a series of small curved or bent perforated tubes, placed within and opening on opposite sides of the tube, and so constructed and arranged that any hard soluble substance which may be placed therein when the tube is to be forced into the ground, will, upon the application of hot water or other suitable liquid, immediately be entirely expelled from the said tubes, and escape to the outside of the well-tube, leaving the perforated tubes perfectly clear, and ready for the reception of water from the outside of the well-tube. Well-tubes, which are used for being forced into the earth to a sufficient depth to obtain water, have been provided with a strainer, of perforated metal or wire gauze, placed around the outside for the purpose of preventing the entrance of sand and other substances which would be liable to obstruct the lower end of the well-tube. Short perforated tubes, extending straight across the well-tube, have also been used; but such have been found to be inefficient for the purposes intended.

In the first instance, the pressure of the clay or other substance against the strainer prevents the water from passing freely into the tube, and such substances are also liable to be forced into the tube.

In the second case, the substance placed in the short, straight, perforated tubes, before sinking the main tube, will not readily run off upon the application of the hot water or liquid, but will remain in the tube, or escape only after repeated applications of such liquid, thus interfering with the free entrance of the water into the well-tube when the latter has been sunk. By my invention, it is believed that these difficulties are entirely overcome, and an efficient and reliable well-tube obtained.

Referring to the drawings, $a$ represents the lower portion of a well-tube, to the bottom of which is secured, in any suitable manner, the boring-tool $b$. The point of this tool is made octagonal, as being best adapted to facilitate its sinking in the ground. Within the lower portion of the well-tube is secured a series of short perforated tubes, of an arched or curved form, as shown at $c$, and opening on opposite sides of the well-tube. They are made circular by preference, but they may be made square, or of other form, and are bevelled at their point of connection with the main tube, so as to insure the escape of any loose substance from within the short tubes. Instead of an arched or curved form, the short tubes may be pointed at the centre, as shown at $d$, fig. 2.

The short perforated tubes are arranged within the main tube alternately, at right angles with each other.

These short perforated tubes are designed to be filled, before sinking into the ground, with some substance which will remain in the same until cleaned by the application of hot water or other liquid, poured into the top of the main tube, for the purpose of preventing the entrance of clay or other substance through which the main tube may be forced. It will thus be seen that as soon as any water or other liquid is poured upon and enters into the arched or bent perforated tubes $c$ $d$, every particle of the substance with which they are filled will immediately be carried off by the inclination of such tubes, leaving the same entirely free and unobstructed, and ready for the admission of the water into the main tube. This is, as will be very evident, a very important feature, and one which renders a well-tube thoroughly efficient for the purposes intended.

I do not claim the application of short perforated tubes to a main tube, but

What I claim as my invention, and desire to secure by Letters Patent, is—

The combination, with a well-tube, of a series of curved or bent perforated tubes, when constructed, applied, and operating substantially as and for the purpose set forth.

In testimony whereof, I have signed my name to this specification in the presence of two subscribing witnesses.

LORENZO LOVEJOY.

Witnesses:
  J. H. ADAMS,
  M. S. G. WILDE.